(12) United States Patent
Kruger et al.

(10) Patent No.: US 12,468,998 B2
(45) Date of Patent: Nov. 11, 2025

(54) SYSTEM FOR CONFIGURING AN ENVIRONMENT BASED ON MODIFICATIONS TO SIMULATED VIRTUAL ENVIRONMENTS

(71) Applicant: Starbucks Corporation, Seattle, WA (US)

(72) Inventors: Joshua J Kruger, Seattle, WA (US); Susan P Behroozi, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 105 days.

(21) Appl. No.: 18/053,726

(22) Filed: Nov. 8, 2022

(65) Prior Publication Data

US 2023/0153734 A1 May 18, 2023

Related U.S. Application Data

(60) Provisional application No. 63/263,975, filed on Nov. 12, 2021.

(51) Int. Cl.
G06Q 10/0637 (2023.01)
G06Q 10/067 (2023.01)

(52) U.S. Cl.
CPC ..... *G06Q 10/06375* (2013.01); *G06Q 10/067* (2013.01)

(58) Field of Classification Search
None
See application file for complete search history.

(56) References Cited

U.S. PATENT DOCUMENTS 10,614,616 B1 * 4/2020 Tedesco .............. G06F 3/04815
2007/0179652 A1 * 8/2007 Weigang .......... G05B 19/41865
700/111

(Continued)

FOREIGN PATENT DOCUMENTS

WO    WO 2023/086410 A1    5/2023

OTHER PUBLICATIONS

Shen, Xiaojun, T. Radakrishnan, and Nicolas D. Georganas. "vCOM: Electronic commerce in a collaborative virtual world." Electronic Commerce Research and Applications 1.3-4 (2002): 281-300 (Year: 2002).*

(Continued)

*Primary Examiner* — Darlene Garcia-Guerra
(74) *Attorney, Agent, or Firm* — Knobbe, Martens, Olson & Bear, LLP

(57) ABSTRACT

The disclosure generally relates to a system for automating a process of determining a particular store layout and/or store configuration for a store. The system may obtain store data associated with a particular store. Based on the store data, the system can access a simulation platform for generating a virtual replication of the store based on the obtained store data. The virtual replication of the store and the store may produce the same or similar production data. Based on the production data of the store, the system can modify the store data to generate modified store data for generating a modified virtual replication of the store. Further, the system can compare the production data from the virtual replication of the store with the production data from the modified virtual replication of the store in order to determine store data that satisfies particular constraints.

22 Claims, 7 Drawing Sheets

(56) References Cited

U.S. PATENT DOCUMENTS

| | | | | |
|---|---|---|---|---|
| 2008/0177513 | A1* | 7/2008 | Miller | G05B 17/02 |
| | | | | 703/2 |
| 2017/0031354 | A1* | 2/2017 | Tyber | G05B 19/41865 |
| 2017/0235853 | A1* | 8/2017 | Griswold | G06F 30/20 |
| | | | | 703/1 |
| 2017/0314232 | A1* | 11/2017 | Chi | G06F 3/0484 |
| 2019/0251622 | A1* | 8/2019 | Wiedmeyer | G06Q 30/0643 |
| 2019/0361407 | A1 | 11/2019 | Vogel et al. | |
| 2020/0265329 | A1 | 8/2020 | Thomsen et al. | |
| 2021/0019528 | A1* | 1/2021 | Ghadyali | G06F 11/3409 |
| 2021/0073430 | A1 | 3/2021 | Levy et al. | |
| 2021/0183051 | A1* | 6/2021 | Nakago | G06N 3/08 |
| 2021/0223854 | A1 | 7/2021 | Zavesky et al. | |
| 2021/0334435 | A1* | 10/2021 | Endler | G06F 30/20 |
| 2022/0027744 | A1* | 1/2022 | Krishnan | G06N 5/02 |
| 2022/0043405 | A1* | 2/2022 | Kim | G05B 13/027 |
| 2022/0194446 | A1* | 6/2022 | Akif | B61L 27/40 |
| 2022/0197265 | A1* | 6/2022 | Jensen | G05B 19/41865 |
| 2022/0292834 | A1* | 9/2022 | DeSantola | G01S 17/88 |
| 2023/0076218 | A1* | 3/2023 | Van Ingen Schenau | |
| | | | | G03F 7/70558 |
| 2023/0076433 | A1* | 3/2023 | Pathak | G06F 30/27 |
| 2023/0099602 | A1* | 3/2023 | Hashiguchi | B25J 9/1661 |
| | | | | 700/245 |

OTHER PUBLICATIONS

Fumarola, Michele, and Ronald Poelman. "Generating virtual environments of real world facilities: Discussing four different approaches." Automation in Construction 20.3 (2011): 263-269 (Year: 2011).*

Moulin, Bernard, and Ali Walid. "Perception-Based Multi-Agent Geo-Simulation in the Service of Retail Location Decision-Making in a Shopping Mail." Canadian Journal of Regional Science 29.3 (2006): 421-444 (Year: 2006).*

Antczak, Tomasz, Rafał Weron, and Jacek Zabawa. "Data-driven simulation modeling of the checkout process in supermarkets: insights for decision support in retail operations." IEEE Access 8 (2020): 228841-228852 (Year: 2020).*

Cheng et al., "DT-II: Digital twin enhanced Industrial Internet reference framework towards smart manufacturing", Robotics and Computer Integrated Manufacturing, Elsevier Science Publishers BV., Barking, GB, vol. 62,Oct. 19, 2019, xp085907365, ISSN: 0736-5845, DOI: 10.1016/J.RCIM.2019.101881.

Guo et al., "A digital twin-based layout optimization method for discrete manufacturing workshop", The International Journal of Advanced Manufacturing Technology, vol. 112, No. 5-6, Jan. 2, 2021, pp. 1307-1318, xp037336676, ISSN: 0268-3768, DOI: 10.1007/S00170-020-06568-0.

International Search Report and Written Opinion received in PCT Application No. PCT/US2022/049441 dated Feb. 16, 2023 in 14 pages.

Quahabi et al., "A Distributed Digital Twin Architecture for Shop Floor Monitoring Based on Edge-Cloud Collaboration", 2021 Third International Conference on Transporation and Smart Technologies (TST), IEEE, May 27, 2021, pp. 72-78, xp033964507, DOI: 10.1109/TST52996.2021.00019.

Zhang et al., "Construction of intelligent integrated model framework for the workshop manufacturing system via digital twin", The International Journal of Advanced Manufacturing Technology, Springer, London, vol. 118, No. 9-10, Oct. 9, 2021, pp. 3119-3132, xp037668977, ISSN: 0268-3768, DOI: 10.1007/S00170-021-08171-3.

Rozanec et al., "Actionable cognitive twins for decision making in manufacturing", Mar. 2021, 25 pages, https://arxiv.org/pdf/2103.12854.

Shao et al., "Credibility consideration for digital twins in manufacturing", Dec. 2022, 8 pages, https://doi.org.10.1016/j.mfglet.2022.11.009.

* cited by examiner

SYSTEM FOR CONFIGURING AN ENVIRONMENT BASED ON MODIFICATIONS TO SIMULATED VIRTUAL ENVIRONMENTS

FIELD

The present disclosure generally relates to a system for generating a virtual environment based on a physical environment and simulating modified virtual environments.

BACKGROUND

A configuration of a physical environment (e.g., a store, a building, an office, a factory, a business, etc.) may be based on a collection of standard designs, layouts, etc. The configuration of the environment may be used in and may be initially set when building the environment. For example, the environment may be built with an initial layout that is based on the configuration of the environment. The configuration of the environment may be generated by a user and may be based on the knowledge or experience of the user. For example, if the user is associated with multiple environments, the user may design a configuration of the environment that is based on configurations of the environments.

Subsequent to the initial setting of the configuration of the environment, the user may modify the configuration of the environment. For example, the user may modify a layout of the environment, a machine (e.g., equipment) allocation, or a worker allocation. However, the modification of the configuration of the environment may be an isolated decision that is based on a particular environment. The modification of the configuration of the environment may cause a decrease in throughput, efficiency (e.g., computing system efficiency), performance (e.g., computing system performance), etc. as compared to a different configuration of the environment and may produce a decrease in throughput, efficiency, performance, etc. as compared to the original configuration of the environment.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DESCRIPTION OF SOME EMBODIMENTS

Figure 1:
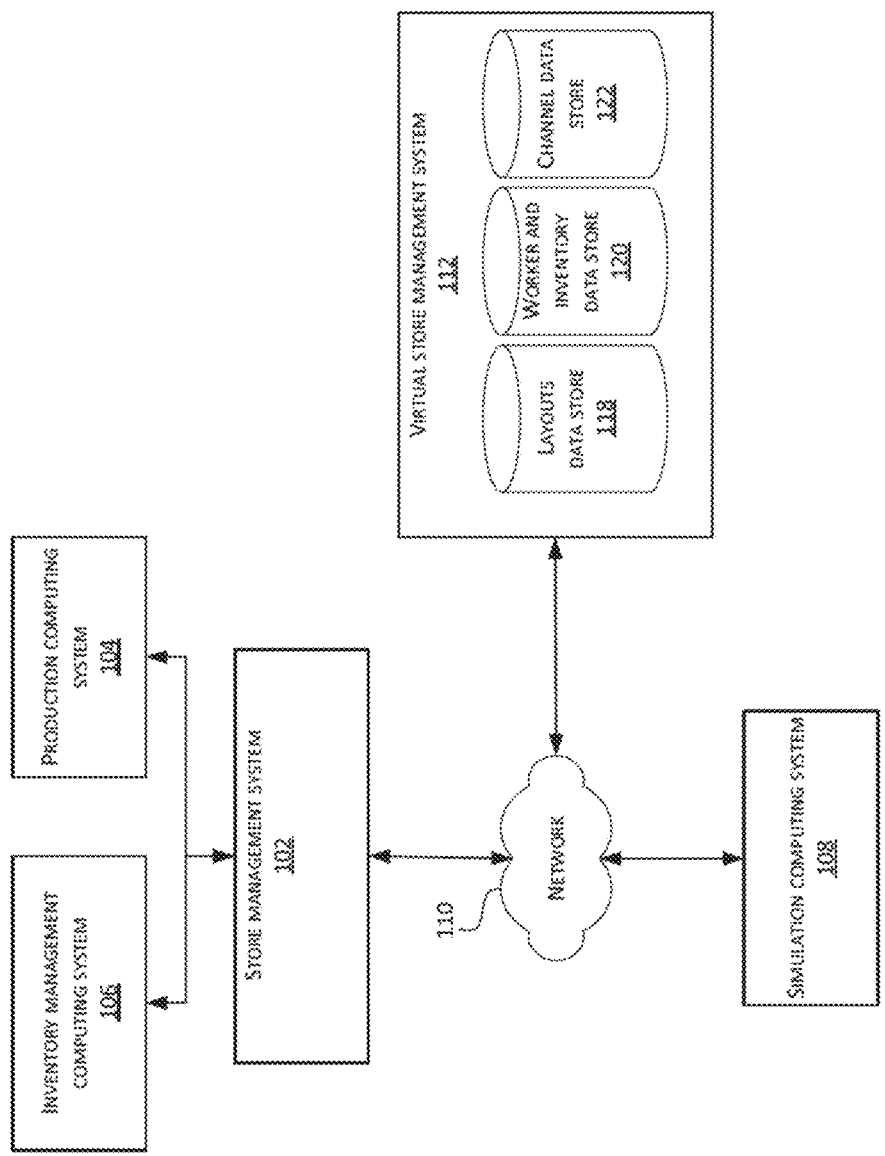
FIGS. 1 and 2 are block diagrams depicting illustrative environments in which a virtual store management system can manage one or more virtual replications of a store.

FIG. 1 is a block diagram of an illustrative operating environment 100 in which a management system 102 (e.g., a computing system associated with a physical environment) and a simulation computing system 108 (e.g., a computing system for implementing a simulation platform for generation of virtualizations associated with the physical environment) may interact with a virtual management system 112 via a network 110. For example, the virtualizations may include virtual replications, virtual environments, virtual physical environments, virtual models, simulations, etc.

While the below disclosure discusses a particular physical environment (e.g., a store), it will be understood that the below disclosure can be implemented with respect to any physical environment (e.g., a store, a building, an office, a factory, a business, etc.).

The store management system 102, the simulation computing system 108, and the virtual store management system 112 may be a closed loop system. By way of illustration, the store management system 102 may include various types of computing devices and/or computing systems that may be in communication with the virtual store management system 112, including a desktop computer, laptop, and a mobile phone. In general, the store management system can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

By way of further illustration, the simulation computing system 108 can include various types of computing devices and/or computing systems for implementing the simulation platform, including a server, a desktop computer, a laptop computer, a mobile phone, etc. In general, the simulation computing system 108 may be any computing device for implementing the simulation platform and may be in communication with the virtual store management system 112 in order to receive store data and generate a virtual replication of the store based on the store data. In some embodiments, the simulation computing system 108 may include a general computing device hosting particular software for implementing the simulation platform. Therefore, the simulation computing system 108 may be any computing device for implementing a simulation platform for building virtual replications of a store.

The virtual store management system 112 may route the store data to the simulation computing system 108 and may receive and compare production data associated with the virtual replications of the stores. The virtual store management system 112 may provide the output to the store management system 102 or any other computing devices based on the comparison. The virtual store management system 112 can provide the store management system 102 (or any other computing devices) with one or more user interfaces, command-line interfaces (CLI), application programing interfaces (API), and/or other interfaces for displaying one or more outputs based on the comparison (e.g., as part of a computer display). Although one or more embodiments may be described herein as using a user interface, it should be appreciated that such embodiments may, additionally or alternatively, use any CLIs, APIs, or other interfaces.

Network

The store management system 102, the simulation computing system 108, and the virtual store management system 112 may communicate via a network 110, which may include any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In some embodiments, one or more of the store management system 102, the simulation computing system 108, the virtual store management system 112 may communicate with the inventory management computing system 106 and/or the production computing system 104 via the network 110.

Inventory Management System

The inventory management computing system 106 may be implemented directly in hardware or software executed by hardware devices and may, for instance, include one or more physical or virtual servers implemented on physical computer hardware configured to execute computer executable instructions for performing various features that will be described herein.

The inventory management computing system 106 may receive inventory data from one or more sensors and/or one or more data stores. For example, the inventory management computing system 106 may identify inventory (e.g., products, equipment, items, etc.) allocated to or associated with a particular store. For example, the inventory may include food products (e.g., sandwiches, eggs, sugar, artificial sweetener, etc.), drink products (e.g., coffee, tea bags, milk, cream, etc.), non-food or drink products (e.g., nitrogen, cutlery, napkins, straws, etc.), or any other products associated with the store. Further, the inventory management computing system 106 may identify inventory data associated with (e.g., delivered to) a particular store. For example, the inventory management computing system 106 may be in communication with and/or may include one or more sensors (e.g., cameras) for monitoring the delivery of inventory. Further, the inventory management computing system 106 may manage the provision of the inventory. The inventory management computing system 106 may be in communication with and/or may include one or more sensors for managing previously delivered inventory. For example, the inventory management computing system 106 may include one or more sensors for managing inventory stored in a storeroom. In some embodiments, the inventory management computing system 106 may identify the inventory data based on worker feedback (e.g., robot worker feedback or human worker feedback). The worker feedback may include an indication of inventory dispense (e.g., dispensed to customers). Further, based on receiving the worker feedback, the inventory management computing system 106 may validate the accuracy of the worker feedback. For example, the inventory management computing system 106 may calculate an amount of inventory based on the worker feedback and may validate the amount of inventory (e.g., by confirming the amount of inventory was provided to customers or the amount of inventory remains in the store). In some embodiments, the inventory management computing system 106 may identify the inventory data based on tracked purchases. For example, the inventory management computing system 106 may identify a base amount of inventory and may modify the based amount of inventory based on the tracked purchases.

The inventory management computing system 106 may periodically or aperiodically provide the inventory data to the store management system 102. For example, the inventory management computing system 106 may provide the inventory data to the store management system 102 every hour, every day, etc. In some embodiments, the inventory management computing system 106 may provide the inventory data to the store management system 102 based on a request from the store management system 102.

Production Computing System

The production computing system 104 may be implemented directly in hardware or software executed by hardware devices and may, for instance, include one or more physical or virtual servers implemented on physical computer hardware configured to execute computer executable instructions for performing various features that will be described herein.

As will be discussed below, the production computing system 104 may receive performance data from one or more sensors and/or one or more data stores. The performance data may identify how one or more components (e.g., workers, equipment, etc.) are performing. The production computing system 104 may include one or more computing systems for identifying performance data associated with the store. In some embodiments, the production computing system 104 may include a computing system (e.g., a vision system) for monitoring worker movement and worker utilization. For example, the production computing system 104 may be in communication with and/or may include a plurality of sensors stationed at various locations throughout the store. The production computing system 104 may utilize the sensors to identify workers and assign tasks to workers. Based on the assigned tasks to workers, the production computing system 104 can determine efficiency associated with particular tasks or particular workers, timing associated with particular tasks or particular workers, etc. In some embodiments, the production computing system 104 may include a computing system for monitoring machine utilization and/or performance. For example, the production computing system 104 may be in communication with and/or may include a plurality of machines (e.g., the machines or sensors associated with the machines) to identify machine timing and/or machine efficiency. The plurality of machines may include a refrigerator, a freezer, a water filtration system, a heating, ventilation, and air conditioning system, an oven, a coffee machine, an espresso machine, a food display case, a chilled food display case, a blender, a specialty coffee machine, etc. Further, the plurality of machines may include multiple of the same type of machine (e.g., the plurality of machines may include multiple blenders). Each of the plurality of machines may communicate with the production computing system via a network (e.g., network 110). In some embodiments, the production computing system 104 may include a computing system for monitoring overall performance (e.g., order timing, order history, order efficiency, store capacity, drive thru capacity, etc.). For example, the production computing system 104 may monitor the number of orders placed in-store, the number of orders placed via the drive-thru, the wait time associated with in-store orders and/or drive-thru orders, etc.

The production computing system 104 may periodically or aperiodically provide the performance data to the store management system 102. For example, the production computing system 104 may provide the performance data to the store management system 102 every hour, every day, etc. In some embodiments, the production computing system 104 may provide the performance data to the store management system 102 based on a request from the store management system 102.

Store Management System

To manage the data associated with a particular store, the store management system 102 can receive a plurality of data from the production computing system 104, the inventory management computing system 106, and/or any other computing systems. The store management system 102 can parse the plurality of data in order to generate the production data. For example, the store management system 102 can parse (e.g., filter, modify, etc.) The plurality of data to identify production data associated with the particular store. For example, the store management system 102 can filter the plurality of data associated with a particular time period (e.g., a particular day), a particular store, a particular location within the store (e.g., particular machines), a particular worker associated with the store, etc. Therefore, the store management system 102 can filter the plurality of data to identify particular production data. In an illustrative embodiment, the store management system 102 is a user computing device and a user may identify or select particular data. For example, the user may designate particular data (e.g., data associated with particular machines, particular inventory, particular workers, etc.) as production data. The store management system 102 may include a variety of components to enable interaction between the store management system 102 and a user. For example, the store management system 102 may include a display system (e.g., a user interface) that causes display of information via the store management system 102. In one embodiment, the display may be displayed by an additional computing system.

The store management system 102 may further identify store data associated with the store. The store data may identify a configuration of the store. For example, the configuration of the store may include a store layout, a store design, an employee allocation, a machine allocation, a machine layout, store operation parameters, ordering parameters, or any other data associated with the configuration of the store. The store data may identify a physical layout of the store. For example, the store data may identify the placement, type, and quantity of tables, chairs, registers, machines, products, etc. Further, the store data may identify whether the store includes a drive-thru component and/or a walk-in component. The store data may also identify the employees allocated to the store. For example, the store data may identify the number, role, and/or type (e.g., management, years, or levels of experience, etc.) of employees that are allocated to the store. Further, the store data may identify how orders are processed and handled by the workers with the store. For example, whether orders are linked to the first available workers, whether certain orders are linked together, etc. The store data may further identify menu options. For example, the store data may identify food and/or drink options that are available for purchase at a particular store (e.g., some stores may not offer particular products such as cold brew coffee). The store management system 102 may identify the store data based on user input (e.g., via a user computing device) and/or via one or more sensors (e.g., one or more cameras to capture the configuration of the store). Therefore, the store management system 102 can identify production data identifying production of the store and store data identifying a configuration of the store.

Simulation Computing System

The store management system 102 may route the store data to the virtual store management system 112, and the virtual store management system 112 may route the store data to the simulation computing system 108. In some embodiments, the simulation computing system 108 may receive the store data directly from the store management system 102. The simulation computing system 108 may receive the store data and implement a simulation platform for generating a virtual replication of the store based on the store data. The simulation platform can perform modeling (e.g., store modeling) in order to build a virtual replication of the store that is based on the configuration of the store. Further, the virtual replication of the store built by the simulation platform may produce virtual production data that is the same as or similar to the production data produced by the store. For example, the simulation platform may be trained based on known mappings of store data to production data such that the simulation platform can generate a virtual replication of the store that produces virtual production data that tracks the production data produced by the store.

The simulation computing system 108 may further generate a plurality of virtual modified replications of the store by modifying all or a portion of the store data associated with the store. For example, the simulation computing system 108 may generate a first virtual modified replication of the store by adding or removing particular machines, a second virtual modified replication of the store by adding or removing an in-store ordering option, a third virtual modified replication of the store by adding or removing particular options from the menu, etc.

In order to determine the production data associated with each virtual replication of the store, the simulation computing system 108 may simulate the virtual replication of the store and determine production data for each virtual replication of the store. In simulating the virtual replication of the store, the simulation computing system 108 can provide various production and/or labor scenarios to the virtual replication of the store and simulate how the virtual replication of the store responds to each scenario based on the store data. Further, the simulation computing system 108 can obtain various timing data associated with particular orders (e.g., particular products) and/or particular tasks (e.g., cleaning machines, making a particular drink, etc.). Therefore, the simulation computing system 108 can identify virtual production data associated with each virtual replication of the store.

Virtual Store Management System

In order to generate an output associated with the store, the virtual store management system 112 may receive the production data associated with the store from the store management system 102 and the virtual production data associated with each of the virtual replications of the store from the simulation computing system 108. The virtual store management system 112 may include one or more components to compare the production data and the virtual production data. In some embodiments, the virtual store management system 112 may include a machine learning model (e.g., a neural network) trained to identify a particular optimized set of store data (e.g., a configuration of the store)

based on the production data and the virtual production data. Further, the virtual store management system 112 may compare the production data and the virtual production data to determine if differences (e.g., statistically significant differences) exist between the production data and the virtual production data. The virtual store management system 112 may then determine if the difference between the production data and the virtual production data exceeds a particular threshold (e.g., a threshold set by a user via a user computing device).

The virtual store management system 112, based on identifying a difference between a particular set of virtual production data and the production data, can generate an output associated with the store. The virtual store management system 112 can cause the output to be displayed via a user computing device (e.g., the store management system 102). In some embodiments, the virtual store management system 112 can cause the automatic implementation of particular store data. For example, the virtual store management system 112 may automatically adjust how orders are processed and assigned to the workers based on identifying that the adjustment is associated with increases in speed of service, worker efficiency, machine efficiency, etc.

Layout Data Store

The virtual store management system 112 may include a layout data store 118. The layout data store 118 may identify one or more layouts that are available for a particular store. For example, the layout data store 118 may identify layouts previously associated with the store, layouts associated with similar stores, layouts derived from the current layout of the store (e.g., by modifying particular store data associated with the current store data). The layouts identified by the layout data store 118 may indicate physical layouts of the store. For example, the layouts may indicate a physical layout of the machines, the tables and/or chairs, the merchandise and/or the merchandise stands, the restroom(s), and/or any other physical components within the store. The layouts may further identify a size and/or shape of the store (e.g., via a floorplan associated with the store). By identifying the layouts, the virtual store management system 112 may dynamically monitor and identify potential layouts for the store. Further, the virtual store management system 112 can provide the potential layouts to the simulation computing system 108 for generation of the virtual replications of the store. In some embodiments, the virtual store management system 112 may also store the current layout of the store in the layout data store 118.

Worker and Inventory Data Store

Further, the virtual store management system 112 may include a worker and inventory data store 120. The worker and inventory data store 120 may identify worker and/or inventory data (e.g., potential worker allocations and/or potential inventory allocations) for a particular store. For example, the worker and inventory data store 120 may identify a number of workers (e.g., five workers), a type of workers (e.g., management, non-management, etc.), a number of workers for a particular station (e.g., two workers are assigned to an espresso machine), an experience level of workers (e.g., five years of experience, no experience, training, etc.), a schedule for the workers, or any other worker data for allocation of workers to the store. Further, the worker and inventory data store 120 may identify a quantity of inventory, a type of inventory, a location of inventory, an inventory delivery schedule, an amount of inventory to order, a product mix, or any other inventory data for allocation of inventory to the store. The worker and/or inventory data allocations of workers and/or inventory previously associated with the store, allocations of workers and/or inventory associated with similar stores, allocations of workers and/or inventory derived from the current allocation of workers and/or inventory of the store (e.g., by modifying particular store data associated with the current store data). By identifying the worker and/or inventory data, the virtual store management system 112 may dynamically monitor and identify potential allocations of workers and/or inventory for the store. Further, the virtual store management system 112 can provide the potential allocations of workers and/or inventory to the simulation computing system 108 for generation of the virtual replications of the store. In some embodiments, the virtual store management system 112 may also store the current allocation of workers and/or inventory of the store in the worker and inventory data store 120.

Channel Data Store

The virtual store management system 112 may include a channel data store 122. The channel data store 122 may identify one or more potential mixtures of channels (e.g., channels of traffic) for a particular store. Further, the mixtures of channels identified by the channel data store 122 may indicate physical channels of traffic of the store. For example, the channel data store 122 may identify potential mixture of in-store traffic, drive-thru traffic, curbside traffic, mobile order (e.g., orders placed via a customer computing device) traffic, or any potential channel of traffic to the store. Further, the channel data store 122 may identify different potential mixtures of the different channels of traffic. For example, a first mixture may include 90% of traffic is in-store traffic and 10% of traffic is drive-thru traffic, a second mixture may include 59% of traffic is mobile ordering traffic, 21% of traffic is curbside traffic, and 20% of traffic is in-store traffic, etc. It will be understood that the mixtures of channels may include any combination of different channels of traffic. By identifying the mixtures of channels, the virtual store management system 112 may dynamically monitor and identify potential mixtures of channels for the store. Further, the virtual store management system 112 can provide the potential mixtures of channels to the simulation computing system 108 for generation of the virtual replications of the store. In some embodiments, the virtual store management system 112 may also store the current mixture of channels of the store in the channel data store 122.

It will be understood that many of the components described in FIG. 1 are optional, and that embodiments of the present disclosure may combine or reorganize the components. Further, embodiments of the present disclosure may include less, different, or more components. Furthermore, the components need not be distinct or discrete. For example, the virtual store management system 112 may be represented in a single physical device, or, alternately, may be split into multiple physical devices.

Production Data

Figure 2:
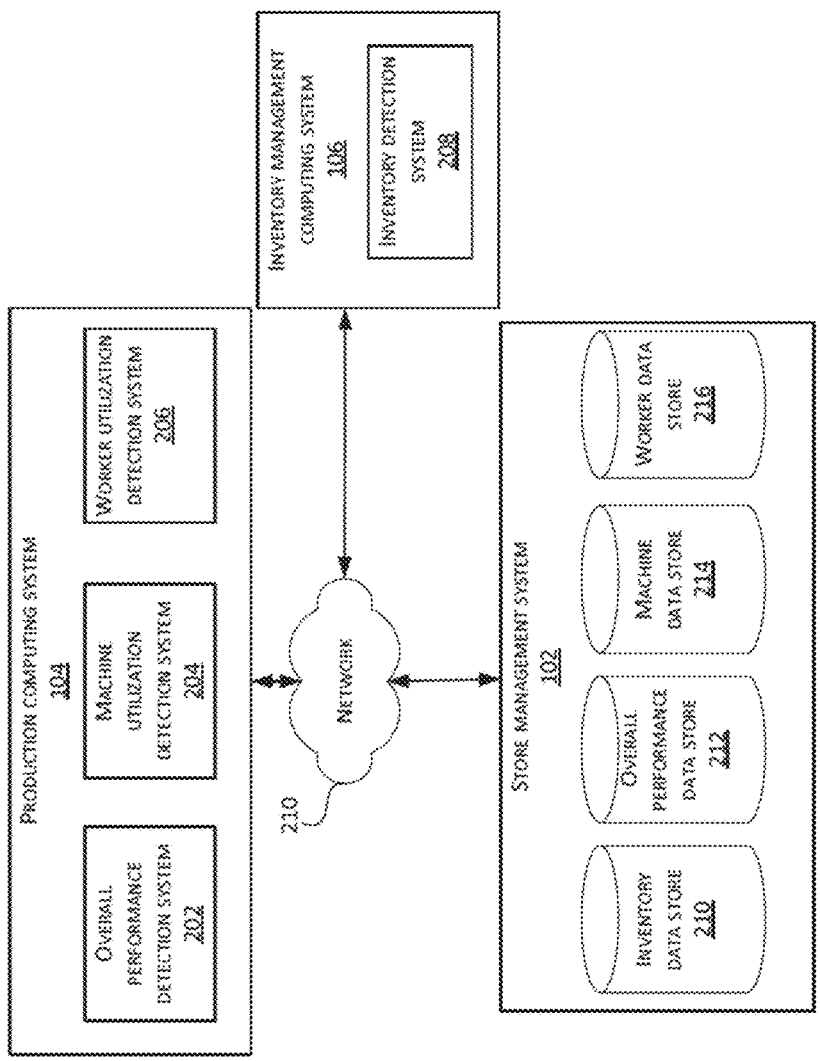

FIG. 2 is a block diagram of an illustrative operating environment 200 in which a store management system 102 (as depicted in FIG. 1), a production computing system 104 (as depicted in FIG. 1), and an inventory management computing system 106 (as depicted in FIG. 1) may interact to provide production data associated with a particular store. Each of the store management system 102, the production computing system 104, and the inventory management computing system 106 may communicate via the network 210. In some embodiments, the network 110 and the network 210 may be the same network. In other embodiments, the network 210 may be a local network and the network may be a non-local network. The production computing system 104 and the inventory management computing system 106 may be associated with one or more stores. In some embodiments, each of the production computing system 104 and the inventory management computing system 106 may provide performance data and/or inventory data associated with multiple stores. Further, each of the production computing system 104 and the inventory management computing system 106 may include one or more systems to identify and/or obtain the performance data and/or the inventory data. For example, as depicted in FIG. 2, the production computing system 104 may include an overall performance detection system 202, a machine utilization detection system 204, and a worker utilization detection system 206 and the inventory management computing system 106 may include an inventory detection system 208. It will be understood that each of the production computing system 104 and the inventory management computing system may include more, less, or different components. Based on the operation of the overall performance detection system 202, the machine utilization detection system 204, the worker utilization detection system 206, and/or the inventory detection system 208, the store management system 102 can receive and store production data in various data stores. For example, the store management system may store inventory data in an inventory data store 211, overall performance data in an overall performance data store 212, machine data in a machine data store 214, and worker data in a worker data store 216.

Inventory Data

The inventory management computing system 106 may include the inventory detection system 208 to obtain and/or produce the inventory data. The inventory detection system 208 may include one or more sensors to monitor particular inventory. For example, the inventory detection system 208 may include one or more cameras to monitor particular inventory and track usage of the inventory. Further, the inventory detection system 208 may track inventory based on day-to-day changes in the inventory. For example, the inventory detection system 208 may track the amount of inventory present at the start of the day and the amount of inventory present at the end of the day. Based on tracking the inventory, the inventory detection system 208 may determine an amount of inventory that is used each day. Further, the inventory detection system 208 may determine the amount of inventory that is used each day based on an order history. For example, if 30 chicken sandwiches have been ordered in a given day, the inventory detection system 208 may determine that the 30 chicken sandwiches have been depleted from the inventory. In some embodiments, the inventory detection system 208 may determine the amount of inventory that is used each day based on worker and/or user feedback. For example, a worker may input the amount of inventory used each day into the inventory detection system 208 and/or another computing system. In some embodiments, the inventory detection system 208 may track if any inventory is ever fully depleted. For example, the inventory detection system 208 may determine if any subset of the inventory (e.g., a subset of the inventory associated with a particular product) is ever fully depleted such that the store no longer has access to related inventory. Further, the inventory detection system 208 may determine if any orders are received for particular products that are unfulfilled based on the inventory not including the particular products. The inventory detection system 208 may monitor the inventory to determine if the inventory is adequate to meet the demand. In some embodiments, the inventory detection system 208 may receive the inventory data from a data store. Therefore, the inventory management computing system 106 may obtain and/or produce inventory data using the inventory detection system 208.

The inventory detection system 208 may provide the inventory data to the inventory management computing system 106. Further, the inventory management computing system 106 may provide the inventory data to the store management system 102. The inventory management computing system 106 may provide the inventory data periodically or aperiodically. Further, the inventory management computing system 106 may store the inventory data in the inventory data store 211 for parsing, filtering, combination, transformation, etc. and provision to the simulation computing system as production data.

Overall Performance Data

The production computing system 104 may include the overall performance detection system 202 to obtain and/or produce the overall performance data. The overall performance detection system 202 may include one or more sensors (e.g., cameras) to monitor the overall performance data of the store. For example, the overall performance detection system 202 may include sensors to monitor and identify a time of customers entering a store (or drive-thru), a time of customers placing an order, a time of initiating production of a product, a time of completing production of a product, a time of customers reaching a drive-thru window to receive the product, and/or a time of order completion. Further, the overall performance detection system 202 may be in communication with one or more computing devices to receive data and may generate the overall performance data based on the received data. For example, the overall performance detection system 202 may be in communication with one or more computing devices associated with registers and may receive data from the one or more computing devices in order to determine order timing, order history, refund history, etc. In some embodiments, the overall performance detection system 202 may receive overall performance data from one or more sensors that monitor store capacity, drive thru capacity, etc. therefore, the overall performance data may include data identifying the number of orders placed in-store, the number of orders placed via the drive-thru, the wait time associated with in-store orders and/or drive-thru orders, the number of customers occupying the store, or any other overall performance data identifying the overall performance of the store. In some embodiments, the overall performance detection system 202 may obtain the overall performance data from a data store. Therefore, the production computing system 104 can obtain the overall performance data via the overall performance detection system 202.

The overall performance detection system 202 may provide the overall performance data to the production computing system 104. Further, the production computing system 104 may provide the overall performance data to the store management system 102. The production computing system 104 may provide the overall performance data periodically or aperiodically. Further, the production computing system 104 may store the overall performance data in the overall performance data store 212 for parsing, filtering, combination, transformation, etc. and provision to the simulation computing system as production data.

Machine Data

The production computing system 104 may include the machine utilization detection system 204 to obtain and/or produce the machine data. The machine utilization detection system 204 may include one or more sensors (e.g., machine sensors) to monitor the performance (e.g., efficiency, accuracy, etc.) of one or more machines (e.g., the store machines). Further, the machine utilization detection system 204 may be in communication with one or more sensors to receive data and may generate the machine data based on the received data. For example, the machine utilization detection system 204 may receive data indicating the usage of a particular machine (e.g., when an espresso machine was operated). Based on the received data, the machine utilization detection system 204 may identify how the particular machine is used and generate machine data that identifies the usage. For example, the machine utilization detection system 204 may generate machine data that identifies the performance of the machine in isolation (e.g., based on previous performance of the machine, based on a threshold or specified (via a specification) performance of the machine, etc.) and/or that identifies the performance of the machine in comparison to other machines (e.g., other machines of the store, other similar machines, etc.). In some embodiments, the machine utilization detection system 204 may receive machine data from the one or more sensors and/or one or more computing devices. For example, particular machine may be equipped with particular sensors and/or computing devices that monitor the machine and generate machine data that identifies the performance of the machine. Further, the machine data may include one or more of an efficiency of a machine, a usage of the machine, a performance of the machine, a repair time of the machine, issues associated with the machine, a down time of the machine, etc. In some embodiments, the machine utilization detection system 204 may obtain the machine data from a data store. Therefore, the production computing system 104 can obtain the machine data via the machine utilization detection system 204.

The machine utilization detection system 204 may provide the machine data to the production computing system 104. Further, the production computing system 104 may provide the machine data to the store management system 102. The production computing system 104 may provide the machine data periodically or aperiodically. Further, the production computing system 104 may store the machine data in the machine data store 214 for parsing, filtering, combination, transformation, etc. and provision to the simulation computing system as production data.

Worker Data

The production computing system 104 may include the worker utilization detection system 206 to obtain and/or produce the worker data. The worker utilization detection system 206 may include one or more sensors (e.g., cameras) to monitor the performance (e.g., efficiency, accuracy, etc.) of one or more workers (e.g., the workers associated with the store). Further, the worker utilization detection system 206 may be in communication with one or more sensors to receive data and may generate the worker data based on the received data. The worker data may identify worker utilization data (e.g., data identifying an amount of time that a worker is being utilized). For example, a sensor may determine that an order has been placed (e.g., via a mobile order, via a register, via a drive-thru, etc.). Further, the sensor may determine that a label for the order has been placed and a worker has begun preparation of the order. The sensor may determine an amount of time that the worker is present at a particular station associated with the order (e.g., where the order is for an espresso drink, the sensor may determine the amount of time that the worker is present at an espresso machine station. Further, the sensor may determine that the worker has handed the order off to the customer. Based on determining that the worker has handed off the order to the customer, the sensor and/or the worker utilization detection system 206 may determine the order is complete. Further, the worker utilization detection system 206 may identify a utilization rate of the worker. For example, the worker utilization detection system 206 may classify each portion of the time required to prepare the order for the particular product. Further, the worker utilization detection system 206 may classify time spent actively preparing the order as "active time" for the worker. The worker utilization detection system 206 may further classify time spent waiting for the order to be prepared by the machine and/or otherwise not actively preparing the order as "idle time" for the worker. Further, the worker utilization detection system 206 may further classify time spent walking between stations (e.g., to further prepare the order, to hand off the order, etc.) as "walking time" for the worker. It will be understood that the worker utilization detection system 206 may classify the time of the worker into more, less, or different classes. Further, the worker utilization detection system 206 can utilize the classified time to determine worker data (e.g., an efficiency, utilization rate, etc. of the particular worker). For example, the worker utilization detection system 206 may compare the active time of the worker to the overall time spent preparing the order to determine the utilization rate and/or efficiency of the worker. In some embodiments, the worker utilization detection system 206 may obtain the worker data from a data store. Therefore, the production computing system 104 can obtain the worker data via the worker utilization detection system 206.

The worker utilization detection system 206 may provide the worker data to the production computing system 104. Further, the production computing system 104 may provide the worker data to the store management system 102. The production computing system 104 may provide the worker data periodically or aperiodically. Further, the production computing system 104 may store the worker data in the worker data store 216 for parsing, filtering, combination, transformation, etc. and provision to the simulation computing system as production data. Therefore, the store management system 102 may receive inventory data, overall performance data, machine data, and/or worker data as production data and may provide the production data to the simulation computing system. In some embodiments, the store management system 102 may transform (e.g., summarize) one or more of the inventory data, the overall performance data, the machine data, and/or the worker data to generate the production data.

Based on the received data, the store management system 102 can generate the production data. For example, the production data may identify one or more of a speed of service, a product queue time, a customer queue time, an order production time, a product production time, a window time, a stack length, a queue length, a worker efficiency and/or utilization, a machine efficiency and/or utilization, a quantity and/or quality of product purchases, a throughput, a balk rate, a customer wait time, etc. For example, the speed of service may be the time period from the customer entering the store (or the drive-thru queue) to a worker handing of the ordered product. Further, the throughput may be the number of products produced within a given time window (e.g., a 30 minute time window). The product queue time may be the time period from the ordering of the product to the assignment of the product to the worker and/or the printing of a label for the product and the customer queue time may be the time period from the customer entering the store (or the drive-thru queue) to the customer placing an order. The order production time may be the time period from the placement of the order to a worker handing of the ordered product and the product production time may be the time period from initiating production of the product to completing production of the product. Further, the window time may be the time period from a vehicle arriving at a drive-thru window to a customer associated with the vehicle receiving an ordered product. The queue length may be a number of customers in an in-store line waiting to order (e.g., not including customers who have previously placed orders) and the stack length may be a number of vehicles in a drive-thru line (e.g., including vehicles corresponding to customers who have previously placed orders).

Process for Generating Virtual Replications of a Store

Figure 3A:
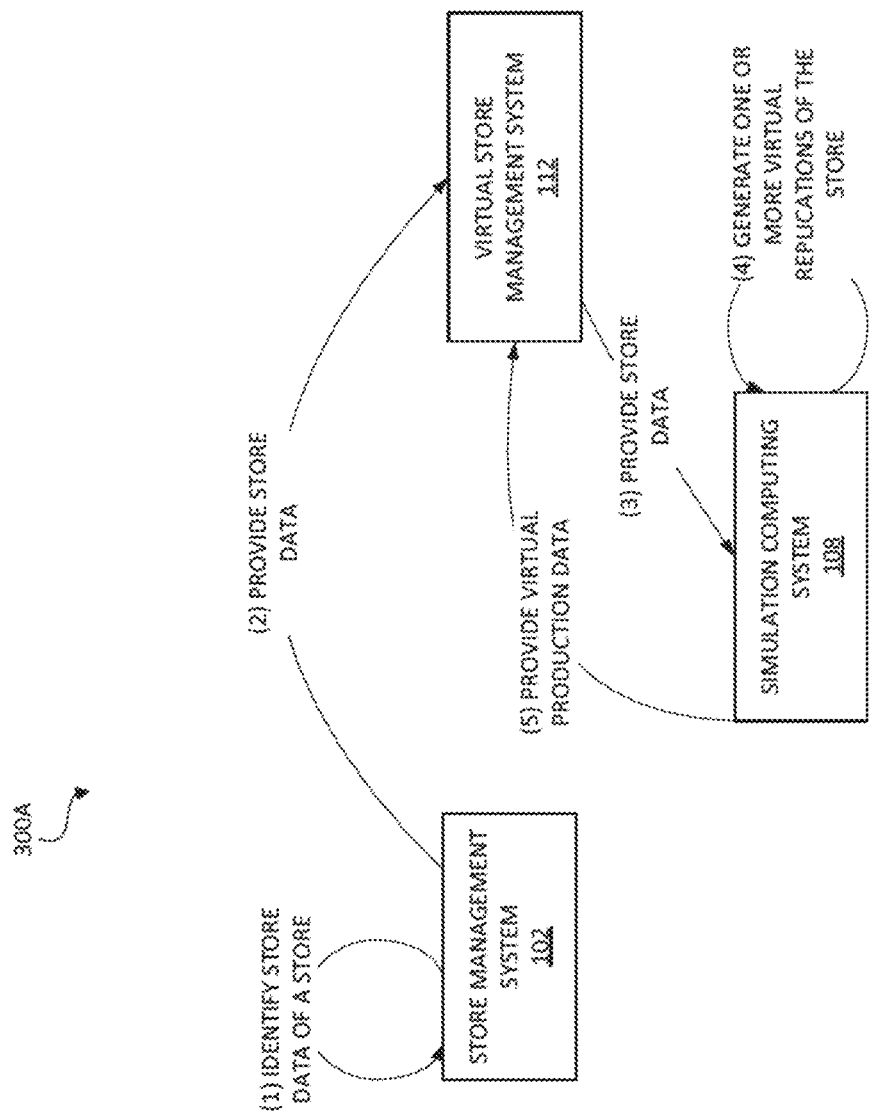
FIGS. 3A and 3B are flow diagrams depicting example interactions for generating the virtual replications of the store.

To further illustrate how the simulation computing system 108 may generate virtual replications of a store and provide associated, virtual replication data to a virtual store management system, FIG. 3A depicts illustrative interactions 300A for identifying store data, generating virtual replications of a store based on the store data, and providing virtual production data based on the virtual replications of the store. The interactions 300A of FIG. 3A may occur, for example, during operation of a store and/or in response to a prompt from a user. Further, the interactions 300A may occur or after an initial configuration of a store.

The interactions of FIG. 3A begin at (1), where a store management system 102 identifies store data of a store. The store management system 102 may identify the store data based on a store identifier associated with a particular store (e.g., a store identifier assigned and/or provided to the store management system). The store management system 102 may receive the store data via a registration process of the store with the store management system 102. Further, the store management system 102 may receive the store data as batch store data or as streaming store data (e.g., store data received in real time). In some embodiments, the store management system 102 may receive the store data from a user computing device, one or more sensors, and/or any other devices. Further, the store management system 102 may identify the store data by analyzing the operation of the store (e.g., to determine the store configuration). The store management system 102 may store the identified store data and may update the stored store data based on subsequently identified store data.

The store data may include data identifying the configuration of the store. For example, the store data may include data identifying a time period for production of particular products and/or particular orders (e.g., a time period for completion of particular orders by hand, by machine, etc.). Further, the store data may include data identifying a time period for particular tasks (e.g., a time required for completion of a particular task). The store data may also include store layout data, worker allocation data, product mixture data, channel mixture data, order data, etc. For example, the store data may identify a store schematic and/or floorplan, the production engine layout of the store, the physical layout of the store, the physical layout of machines within the store, the physical layout of the drive-thru, the physical layout of furniture within the store, a quantity, type, and/or quality of machines within the store, a mixture of channels of traffic associated with the store, a mixture of products associated with the store, worker allocation, an order history, etc. The mixture of products associated with the store may identify a mixture of product types and/or number of items for each order (e.g., 40% of orders include at least 2 items, 40% of orders include an americano, etc.). Further, the mixture of channels may identify a mixture of channels of traffic (e.g., 30% of orders are ordered via a drive-thru, 20% of orders are ordered in-store, 10% of orders are ordered via a mobile order, etc.) The order history may identify a course of orders across a day (e.g., the order history may identify a peak order time window, a non-peak order time window, etc.). Therefore, the store management system 102 can identify the store data of the store.

Based on identifying the store data, at (2), the store management system 102 provides the store data to the virtual store management system 112. The store management system 102 may parse the store data and provide a subset of the store data to the virtual store management system 112. In some embodiments, the store management system 102 may provide the store data to a store data store. For example, the store management system 102 may store the store data in a store data store with an identifier of the store associated with the store data. The virtual store management system 112 may obtain the store data from the data store based on the identifier of the store associated with the store data. Therefore, the store management system 102 may provide the store data to the virtual store management system 112.

Based on receiving the store data, at (3), the virtual store management system 112 provides the store data to the simulation computing system 108 for generation of virtual replications of the store. The virtual store management system 112 may provide the store data obtained from the simulation computing system 108 or a subset of the store data obtained from the simulation computing system 108 to the simulation computing system. Further, the virtual store management system 112 may provide the store data with a request to generate virtual replications of the store. Further, the virtual store management system 112 may indicate how the simulation computing system 108 is to generate the one or more replications of the store based on the store data. Therefore, the virtual store management system 112 may provide the store data to the simulation computing system 108.

To identify modified versions of the store, at (4), the simulation computing system 108 generates the one or more virtual replications of the store. To generate the one or more virtual replications of the store, the simulation computing system may provide input data to a simulation platform. In some embodiments, the input data may be a script for the generation of the one or more virtual replications of the store. The input data may include one or more base inputs associated with the store (or a plurality of stores). For example, the base inputs may include inputs or parameters (e.g., timing data that is associated with a plurality of stores). The input data may also include one or more customized inputs associated with the store. The customized inputs may include the store data. Based on the provided input data, the simulation computing system 108 can generate a virtual replication of the store. Further, the simulation computing system 108 can modify one or more inputs or parameters of the input data to generate a modified virtual replication of the store. The modified virtual replication of the store may identify how the store would operate if one or more parameters were changed. For example, the modified virtual replication of the store may identify how operation of the store would change if the store layout were modified (e.g., an in-store ordering option was removed). The simulation computing system 108 may generate a plurality of modified virtual replications of the store. Therefore, the simulation computing system 108 can generate one or more virtual replications of the store.

Based on the one or more virtual replications of the store, at (5), the simulation computing system 108 provides virtual production data to the virtual store management system 112. The simulation computing system 108 may generate the one or more virtual replications of the store and simulate the operation of the one or more virtual replications of the store. Based on the simulation of the operation of the one or more virtual replications, the simulation computing system may identify virtual production data associated with the one or more virtual replications. For example, each of the one or more virtual replications may produce virtual replication data identifying the operation of the corresponding virtual replication. In some embodiments, the simulation computing system 108 and/or the virtual store management system 112 may identify key performance indicators based on the virtual production data. For example, the key performance indicators may include a speed of service (e.g., per item, per store, per queue length, etc.), a worker utilization and/or efficiency (e.g., per worker), a throughput (e.g., per machine, per station of the store, etc.), etc. based on the virtual production data. Therefore, the simulation computing system 108 can provide the virtual production data to the virtual store management system 112.

Figure 3B:
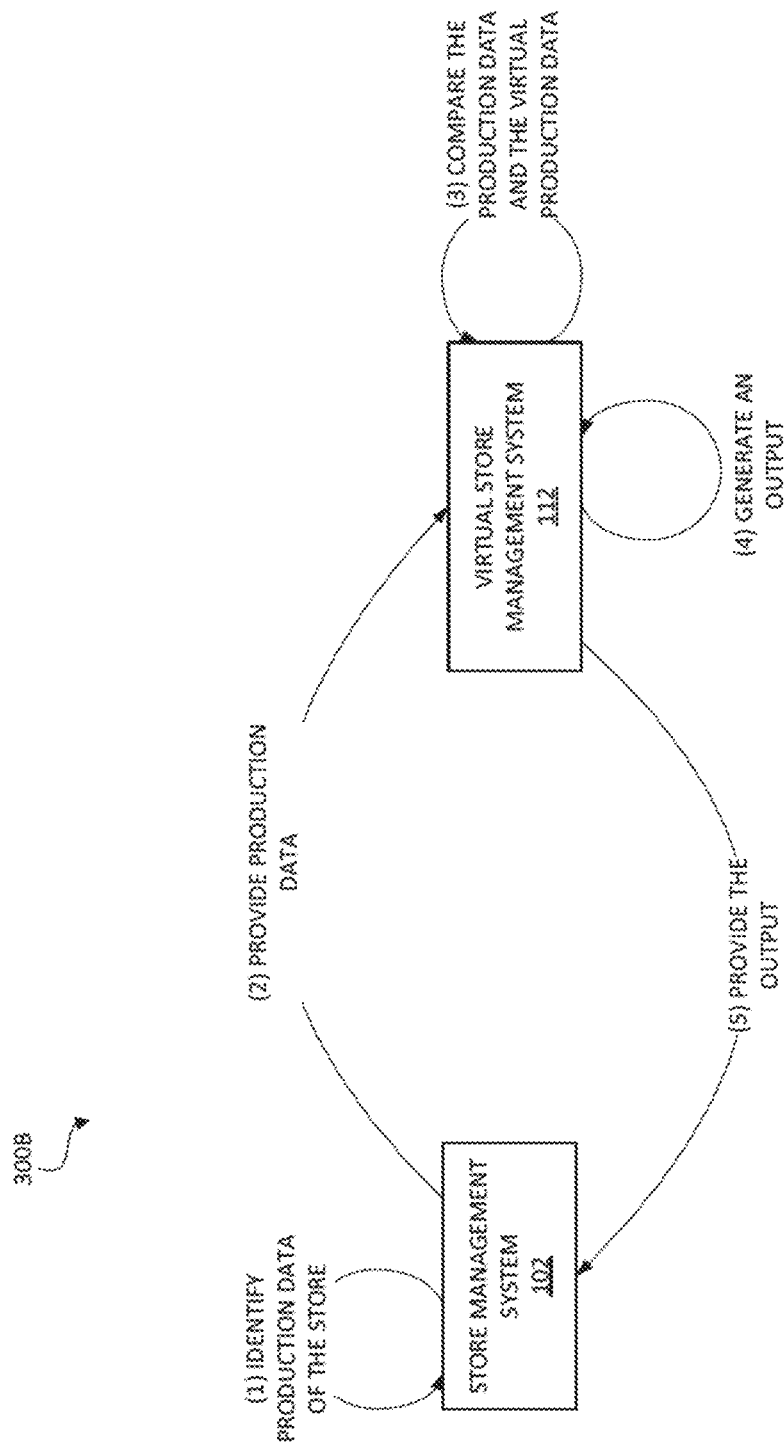

To further illustrate how the virtual store management system 112 can generate the virtual replications of the store, FIG. 3B depicts illustrative interactions 300B for generating the virtual replications of the store, including comparing production data and virtual production data. The interactions 300B of FIG. 3B may occur, for example, after a simulation computing system 108 has simulated the performance of one or more virtual replications of a store to identify virtual production data. Further, the interactions 300B may occur after an initial configuration of the store. In some embodiments, the interactions 300B may occur subsequent to the interactions 300A of FIG. 3A.

The interactions of FIG. 3B begin at (1), where a store management system 102 identifies production data of the store. The store management system 102 may identify the production data based on a store identifier associated with a particular store (e.g., a store identifier assigned and/or provided to the store management system). The production data may identify a performance of the store that may be based at least in part on the configuration of the store identified by the store. Further, the production data may identify how the store is operating based on the store data. For example, the store management system 102 may analyze the production data to identify key performance indicators (e.g., a speed of service, worker utilization data, machine utilization data, efficiency, etc.). The store management system 102 may receive the production data as the store is operated. For example, the store management system 102 may periodically or aperiodically receive production data identifying worker data, machine data, overall performance data, inventory data, etc. Further, one or more computing devices may periodically report the production data to the store management system 102. The store management system 102 may receive the production data as batch production data or as streaming production data (e.g., production data received in real time). As discussed above, the store management system 102 may receive the production data from a user computing device, one or more sensors, and/or any other devices. Therefore, the store management system 102 can identify the production data of the store.

Based on identifying the production data, at (2), the store management system 102 provides the production data to the virtual store management system 112. The store management system 102 may parse the production data and provide a subset of the production data to the virtual store management system 112. The store management system 102 may provide the production data to the virtual store management system 112 subsequent to, during, or after simulation of the virtual replications of the store by the simulation computing system 108 to generate the virtual production data. In some embodiments, the store management system 102 may provide the production data to a production data store. For example, the store management system 102 may store the production data in a production data store with an identifier of the store associated with the production data. The virtual store management system 112 may obtain the production data from the data store based on the identifier of the store associated with the production data. Therefore, the store management system 102 may provide the production data to the virtual store management system 112.

Based on receiving the production data from the store management system 102 and the virtual production data from the simulation computing system 108, at (3), the virtual store management system 112 compares the production data and the virtual production data. The virtual store management system 112 may compare the production data and the virtual production data to identify a particular set of store data (e.g., a particular store configuration). For example, the virtual store management system 112 may compare the production data and the virtual production data to identify store data associated with a highest speed of service, a highest worker utilization rate, a highest machine utilization rate, etc. Further, the comparison of the production data and the virtual production data may be based on one or more user goals. The one or more user goals may be associated with a user of the virtual store management system 112 and may indicate a preference or goal of the user. For example, the one or more user goals may identify a preference for increased speed of service, for increased worker utilization rate, for increased machine utilization rate, etc. Based on the one or more user goals, the virtual store management system 112 may compare specific components of the production data and the virtual production data. At a first time (e.g., during the afternoon), the user may be associated with a first user goal (e.g., increased throughput) and, at a second time (e.g., during the evening) the user may be associated with a second, different user goal (e.g., increased speed of service). In some embodiments, the virtual store management system 112 may compare the production data with a plurality of virtual production data associated with a plurality of virtual replications of the store. Therefore, the virtual store management system 112 compares the production data and the virtual production data.

Based on the comparing the production data and the virtual production data, at (4), the virtual store management system 112 generates an output. The virtual store management system 112 may generate the output (or a plurality of the outputs) based at least in part on the comparison of the production data and the virtual production data and the user goals. For example, the virtual store management system 112 may generate an output based on determining whether the difference between the production data and the virtual production data exceeds a threshold (e.g., a user threshold, a system threshold, etc.) If the difference between the production data and the virtual production data exceeds the threshold, the virtual store management system 112 may generate an output that includes a modified virtual replication of the store with a modified configuration of the store based on store data associated with the virtual production data. If the difference between the production data and the virtual production data does not exceed the threshold, the virtual store management system 112 may generate an output that includes a virtual replication of the store with a current configuration of the store (e.g., based on a user preference to maintain the current configuration of the store). For example, the output may identify a modified configuration of the store with discontinued in-store ordering, discontinued products (e.g., americanos), initiation of in-store dining, etc. based on the virtual replication of the store associated with the modification. Further, the output may include a reordering of multiple received orders and/or an order with multiple products. For example, the store may receive a first order for a first product, a second order for a second product and a third product, and a third order for a fourth product. The output may include a worker schedule to assign and start production of the first product, assign and complete production of the third product, assign and start production of the second product, assign and complete production of the fourth product, and complete production of the first and second products. Therefore, the virtual store management system 112 can generate the output.

Based on the output, at (6), the virtual store management system 112 provides the output for the user to the store management system 102 associated with the user. Further, the store management system 102 may route the output to a user computing device associated with the user.

In response to receiving the output, the user computing device may display the output. For example, the user computing device may display the output via an interface (e.g., an API, a CLI, or any other interface). Further, the user computing device may display the output via a web page, a mobile API, a voice interface, or any other interface for the user computing device.

Example Simulation User Interface

Figure 4:
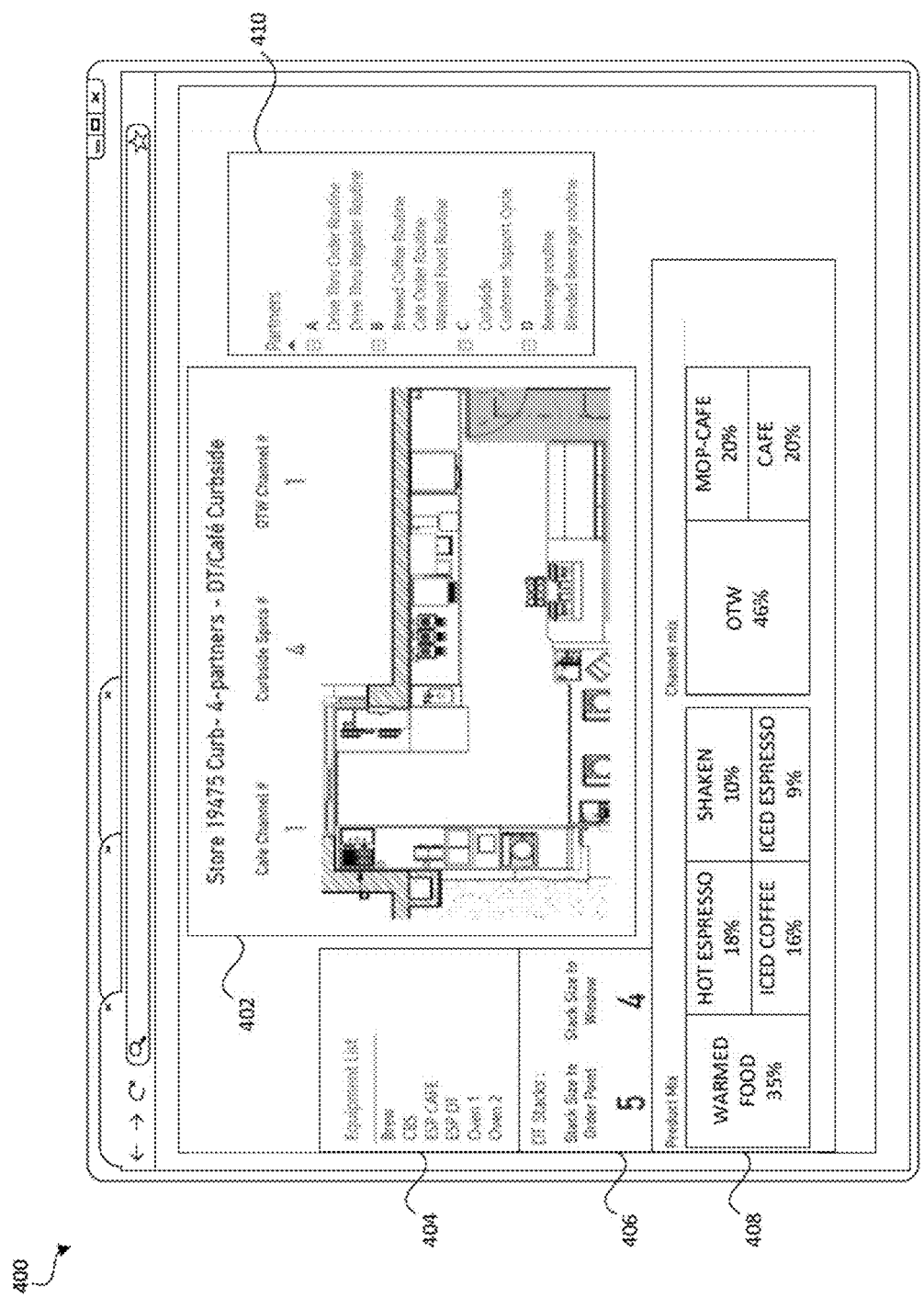
FIG. 4 depicts an example user interface illustrating a virtual replication of a store.

FIG. 4 is a pictorial diagram depicting an example user interface 400 by which a user computing device may provide information associated with a virtual replication of a store. The virtual store management system 112 and/or the simulation computing system 108 may cause presentation and/or display of the user interface 400. The user interface 400 may further include a prompt recommending that the user modify the configuration of the store based on a configuration of the virtual replication of the store. The virtual store management system 112 and/or the simulation computing system 108 may further cause display of the user interface 400 based on receiving a prompt from a user computing device or identifying an action associated with the user computing device (e.g., navigation to a particular API). The virtual replication of the store may identify particular information associated with the store. For example, the information associated with the store may include information associated with a type of order (e.g., a mobile order ("MOP"), a drive-thru order (e.g., an out the window order ("OTW"), etc.), a physical layout of the store (e.g., a drive-thru ("DT") of the store, a cold beverage station ("CBS") of the store, a hot beverage station of the store, etc.) and/or a machine of the store (e.g., an espresso ("ESP") machine of the store).

The user interface 400 includes a plurality of portions. For example, the user interface 400 includes a first portion 402, a second portion 404, a third portion 406, a fourth portion 408, and a fifth portion 410. It will be understood that the user interface 400 may include more, less, or different portions. Further, portions of the user interface 400 may be interactive such that interactions with the user interface 400 causes display of additional information associated with the virtual replication of the store.

The user interface 400 may identify a virtual replication of a store. Further, the first portion 402 of the user interface 400 may identify a physical layout of the virtual replication of the store. For example, the first portion 402 of the user interface 400 may identify a physical placement of workers, machine, furniture, registers, etc. Further, the first portion 402 may identify channels of traffic associated with the store. In the example of FIG. 4, the first portion 402 identifies the virtual replication of the store as including "1 Café Channel," "4 Curbside Spots," and "1 OTW Channel." The first portion 402 may identify a store identifier and a number of workers associated with the store. In the example of FIG. 4, the first portion identifies the number of workers as "4 partners" and identifies store identifying information "Store 19475 Curb" and "DT/Café/Curbside."

The second portion 404 of the user interface 400 may identify machines associated with the virtual replication of the store. For example, the second portion 404 may identify machines placed within the virtual replication of the store. In some embodiments, the second portion 404 may identify where each machine is located in the virtual replication of the store. In the example of FIG. 4, the second portion 404 identifies the machine associated with the virtual replication as "Brew," "CBS," "ESP Café," "ESP DT," "Oven 1," and "Oven 2."

The third portion 406 of the user interface 400 may identify information associated with a drive-thru of the store. For example, the third portion 406 may identify a number of vehicles (e.g., an average number of vehicles) in a drive-thru line each time a drive-thru order is placed within the virtual replication of the store. In some embodiments, the number of vehicles may include a vehicle corresponding to a prior order. Further, the third portion 406 may identify a number of vehicles prior to an order point (e.g., a number of vehicles corresponding to customers waiting to order) and a number of vehicles prior to a delivery point (e.g., a number of vehicles corresponding to customers who have placed orders but are waiting to receive the ordered product). In the example of FIG. 4, the third portion 406 identifies "DT Stacks" for the virtual replication of the store as include a "Stack Size to Order Point 5" and a "Stack Size to Window 4."

The fourth portion 408 of the user interface 400 may identify a product mix and/or a channel mix associated with the virtual replication of store. For example, the fourth portion 408 may identify how traffic to the store is divided across different channels and/or how orders are divided across different products. In the example of FIG. 4, the fourth portion 408 identifies a product mix that includes "35%" "Warmed Food," "18%" "Hot Espresso," "16%" "Iced Coffee," "10%" "Shaken," and "9%" "Iced Espresso." The fourth portion 408 further identifies a channel mix that includes "46%" OTW, "20%" mobile orders for pickup in-store, and "20%" in-store orders.

The fifth portion 410 of the user interface 400 may identify worker allocation. For example, the fifth portion 410 may each worker associated with the virtual replication of the store and a location and/or assignment of each worker. For example, each worker may be assigned to a particular station. In the example of FIG. 4, the fifth portion 410 identifies worker "A" is assigned to "Drive Thru Order Routine" and "Drive Thru Register Routine," worker "B" is assigned to "Brewed Coffee Routine," "Café Order Routine," and "Warmed Food Routine," worker "C" is assigned to "Curbside" and "Customer Support Cycle," and worker "D" is assigned to "Beverage Routine" and "Blended Beverage Routine." It will be understood that the user interface 400 may include more, less, or different information. Further, it will be understood that the virtual replication of the store may be associated with more, less, or different machines, channels, workers, configurations, etc.

It will be understood that FIG. 4 is provided for purposes of example, and that the present disclosure is not limited to a particular user interface or interfaces. It will further be understood that the user interface may be combined with other user interfaces, divided, or reorganized within the scope of the present disclosure. For example, the portion 402 of the user interface 400 and portion 408 of the user interface 400 may be divided into separate user interface, and separate interfaces may be implemented to display the virtual replication of the store and the product mix and/or channel mix of the store. In some embodiments, separate user interfaces may be displayed identifying recommended changes for customer interactions, worker allocations, machine allocations, layout modifications, etc. FIG. 4 is thus understood to be illustrative and not limiting.

Figure 5:
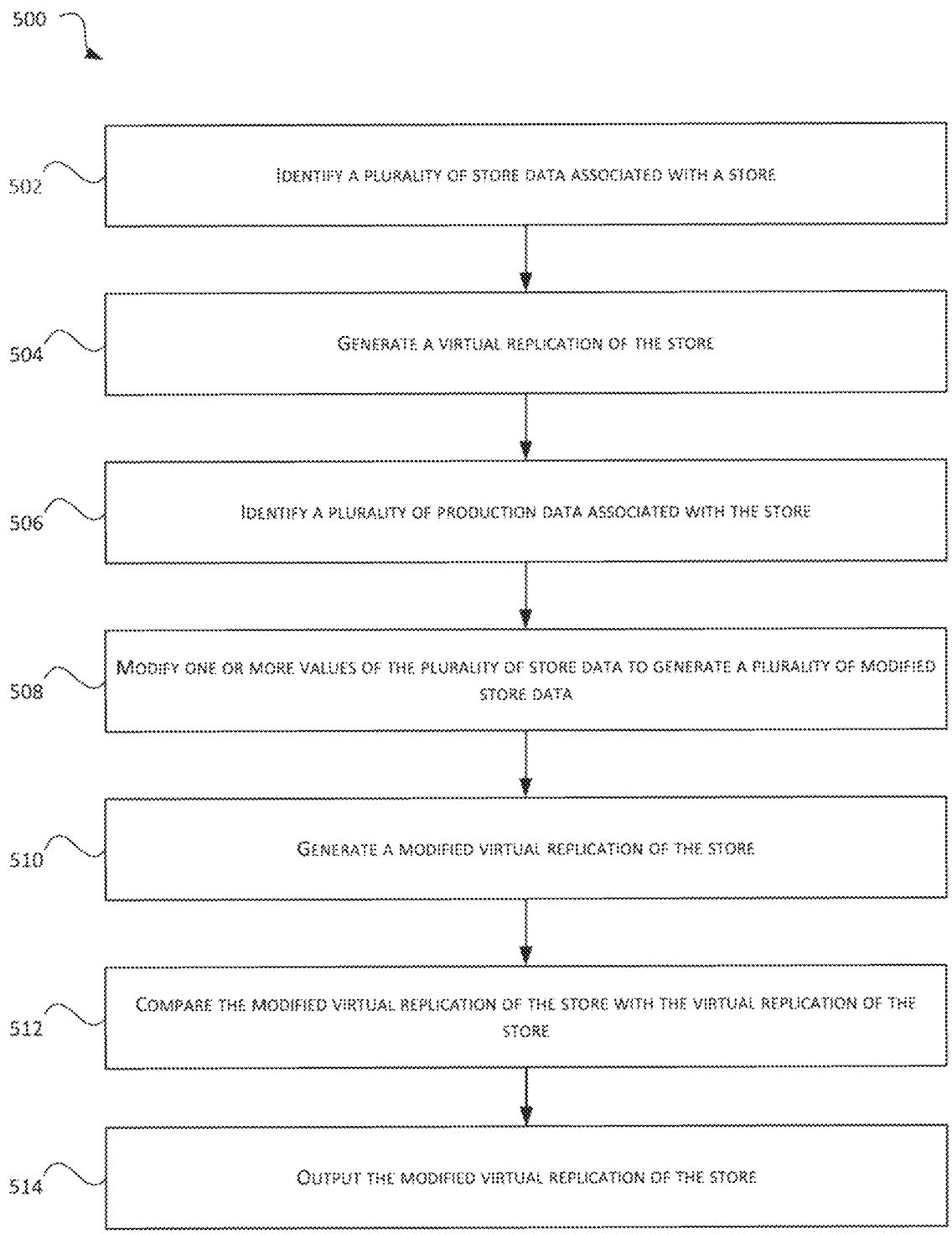
FIG. 5 is a flow chart depicting an illustrative routine for generating the virtual replications of the store and generating an output.

With reference to FIG. 5, an illustrative routine 500 will be described for generating virtual replications of the store. The routine 500 may be implemented for example, by the virtual store management system 112 of FIG. 1. The routine 500 begins at block 502, the virtual store management system 112 identifies a plurality of store data associated with a store. For example, the plurality of store data may be associated with operation of the store. In some cases, the virtual store management system 112 may identify a plurality of environment data associated with a physical environment (e.g., a store, a building, an office, a factory, a business, etc.). The plurality of store data may include at least one of inventory data, store configuration data, labor allocation data, store layout data, and/or machine allocation data (e.g., equipment allocation data). The labor allocation may identify one or more workers associated with the store (e.g., robot workers or human workers).

At block 504, the virtual store management system 112 generates a virtual replication of the store. For example, the virtual replication of the store may be a virtual store, a virtual model, etc. In some cases, the virtual store management system 112 may generate a virtual environment (e.g., a virtual store) modelling a physical environment (e.g., a store). The virtual store management system 112 may access a simulation platform to generate the virtual replication of the store. The simulation platform may generate the virtual replication of the store based on the plurality of store data. To generate the virtual replication of the store, the simulation platform may run a plurality of simulations and may compare an output of each of the plurality of simulations to verify the virtual replication. At block 506, the virtual store management system 112 identifies a plurality of production data associated with a store. The virtual store management system 112 may identify the plurality of production data based on the virtual replication of the store. For example, the plurality of production data may include at least one of sensor data, machine data (e.g., equipment data), ordering data, inventory data, and/or order processing data. Further, the virtual store management system 112 may receive the plurality of production data from another computing system (e.g., the store management system 102). For example, the virtual store management system 112 may obtain the plurality of production data, in real time, from one or more sensors. Further, the virtual store management system 112 may obtain the plurality of production data, in real time, from a store computing system associated with the store. The store computing system may monitor a worker associated with the store and identify worker utilization data associated with the worker based on monitoring the worker. Further, the plurality of production data may include the worker utilization data. The worker utilization data may identify a status of the worker at a particular time (e.g., active, idle, walking, etc.). Further, the store computing system may monitor a machine (e.g., particular equipment) associated with the store and identify machine utilization data associated with the machine based on monitoring the machine. The plurality of production data may include the machine utilization data. Based on the plurality of production data, the virtual store management system 112 may determine a speed of service, a throughput, and/or labor usage associated with the store.

In some cases, the virtual store management system 112 may utilize the production data to test (e.g., in real time) the virtual replication of the store. For example, the virtual store management system 112 may compare the production data associated with the store with production data associated with the virtual replication of the store to align a data stream associated with the store with a data stream associated with the virtual replication of the store. The virtual store management system 112 may compare the production data associated with the store with production data associated with the virtual replication of the store to confirm whether the virtual replication of the store is modelling the store. For example, the virtual store management system 112 may confirm whether the production data associated with the store matches the production data associated with the virtual replication of the store within a certain degree of accuracy (e.g., 90%, 95%, 97%, etc.). In some cases, the degree of accuracy may be system-generated or user-generated. If the virtual store management system 112 determines the production data associated with the store does not match the production data associated with the virtual replication of the store within the certain degree of accuracy, the virtual store management system 112 may adjust (e.g., in real time) one or more values associated with the virtual replication of the store and retest the store. For example, the virtual store management system 112 may modify one or more values associated with a particular sensor, a particular piece of equipment, the workers, etc. The virtual store management system 112 may repeat any number of iterations of adjusting and retesting the virtual replication of the store.

At block 508, the virtual store management system 112 modifies one or more values of the plurality of store data to generate a plurality of modified store data. The virtual store management system 112 may modify one or more values of the plurality of store data to generate the plurality of modified store data based on identifying the plurality of production data associated with the store.

In some cases, the virtual store management system 112, a separate system, and/or a user (via a user computing device) may define modifiable values of the plurality of store data. The virtual store management system 112, the separate system, and/or the user may indicate that values associated with one or more of a number of partners, a type of partners, a size of the store, a number of equipment, a type of equipment, an amount of waste, a drive-thru, mobile ordering, etc. are modifiable or are not modifiable. For example, the user may indicate that values associated with a number of equipment, a type of equipment, a drive-thru, and mobile ordering are modifiable, and values associated with number of partners, a type of partners, a size of the store, and an amount of waste are not modifiable. Further, the virtual store management system 112, the separate system, and/or the user may provide value parameters (e.g., a range, a maximum, a minimum, an average, a mean, etc.) for one or more values. For example, a user may indicate that a value associated with a number of workers may not be modified to be over 10 workers. The virtual store management system 112 may generate the plurality of modified store data based on the modifiable values and/or the parameters.

At block 510, the virtual store management system 112 generates a modified virtual replication of the store. The virtual store management system 112 may access the simulation platform to generate the modified virtual replication of the store. The simulation platform may generate the modified virtual replication store based on the plurality of modified store data. As discussed above, to generate the modified virtual replication of the store, the simulation platform may run a plurality of simulations and may compare an output of each of the plurality of simulations to verify the modified virtual replication. Further, the simulation platform may map a plurality of sets of store data including the plurality of store data to a plurality of sets of virtual production data including the plurality of production data in order to determine how to simulate the modified virtual replication.

Based on the virtual replication and the modified virtual replication, at block 512, the virtual store management system 112 compares the modified virtual replication of the store with the virtual replication of the store. The comparison of the modified virtual replication of the store and the virtual replication of the store may be based on the plurality of production data. Further, to compare the modified virtual replication of the store and the virtual replication of the store, the virtual store management system 112 may compare production data associated with the modified virtual replication with the production data associated with the store. In some embodiments, the virtual store management system 112 may compare a plurality of modified virtual replications of the store (including the modified virtual replication of the store) with the virtual replication of store based on the plurality of production data. Further, the virtual store management system 112 may further determine one or more user goals and the user goals may correspond to one or more speed of service, throughout, and/or labor usage. The comparison of the modified virtual replication and the virtual replication may be based on the one or more user goals. In some embodiments, each of the user goals may be associated with particular conditions and comparison of the modified virtual replication with the virtual replication may be based on the particular conditions.

In order to determine a store configuration for the store, at block 514, the virtual store management system 112 outputs the modified virtual replication of the store. The output of the modified virtual replication of the store may be based on comparing the modified virtual replication of the store with the virtual replication of the store. In some embodiments, the output of the modified virtual replication of the store may be based on comparing a plurality of modified virtual replications with the virtual replication. The output may include data associated with the modified virtual replication of the store. For example, the output may include a modified store layout associated with the store, a modified worker allocation associated with the store, or a modified machine (e.g., equipment) allocation associated with the store. Further, the output may include a worker schedule and a scheduling system may dynamically define the worker schedule.

In some embodiments, the virtual store management system 112 may cause display of the output. The virtual store management system 112 may cause display of the output via a display of a user computing device associated with a user.

The virtual store management system 112 may output the modified virtual replication of the store as a recommendation for the user (e.g., a recommended layout of the store). In some cases, to generate the recommendation, the virtual store management system 112 may compare the modified virtual replication of the store and the virtual replication of the store based on cost to implement the recommendation, savings based on implementing the recommendation, productivity based on implementing the recommendation, etc. For example, the virtual store management system 112 may recommend the modified virtual replication of the store based on determining that the savings based on implementing the recommendation exceed the cost to implement the recommendation by a particular amount (e.g., 10%, 20%, etc.).

In some cases, the virtual store management system 112 may identify a subset of production data associated with one or more sensors of the store. For example, the virtual store management system 112 may identify a first subset of the production data associated with a motion sensor associated with a drive-thru window, a second subset of the production data associated with a proximity sensor associated with a register, a third subset of the production data associated with a sensor associated with an espresso machine, etc. The virtual store management system 112 may identify the subsets of the production data based on a manner of parsing the production data. For example, a user (via a user computing device) may identify a manner of parsing the production data to identify a subset of the production data associated with a particular sensor. In some cases, a user may periodically or aperiodically update a manner of parsing the production data. For example, a user may add a sensor to the store and define a manner of parsing the production data to identify a subset of the production data associated with the sensor and/or a user may update and/or add a manner of parsing the production data to identify a subset of the production data associated with a previously added sensor.

Further, the virtual store management system 112 may define a virtual sensor in the virtual replication of the store corresponding the sensor. The virtual store management system 112 may define a subset of the virtual production data associated with the virtual replication of the store that is associated with the virtual store. Based on the subset of the virtual production data and the subset of the production data, the virtual store management system 112 may compare the store and the virtual replication of the store. As the virtual store management system 112 may dynamically identify and/or define a subset of data associated with a particular sensor, the virtual store management system can dynamically adjust the granularity of the comparison of the store and the virtual replication of the store. This can enable the virtual store management system 112 to correlate the virtual replication of the store to the store on a dynamic granular level (e.g., based on individual sensors associated with the store). In some cases, the virtual store management system 112 may tune the virtual replication of the store and/or a particular virtual sensor of the virtual replication of the store based on comparing the store and the virtual replication of the store using the subset of the virtual production data and the subset of the production data. In other cases, the virtual store management system 112 may replace the virtual replication of the store based on comparing the store and the virtual replication of the store using the subset of the virtual production data and the subset of the production data. Further, the virtual store management system 112 can utilize the defined subset of the virtual production data to compare the modified virtual replication of the store with the virtual replication of the store (e.g., using the subset of the virtual production data and a subset of the modified virtual production data).

In various embodiments, the execution routine 500 may include more, fewer, different, or different combinations of blocks than those depicted in FIG. 5. For example, the routine 500 may include, in some embodiments, display of the virtual replication. As a further example, blocks 504 and 508 may be combined, and the routine 500 may access the simulation platform to generate the virtual replication and the modified virtual replications simultaneously. The routine 500 depicted in FIG. 5 is thus understood to be illustrative and not limiting.

Figure 6:
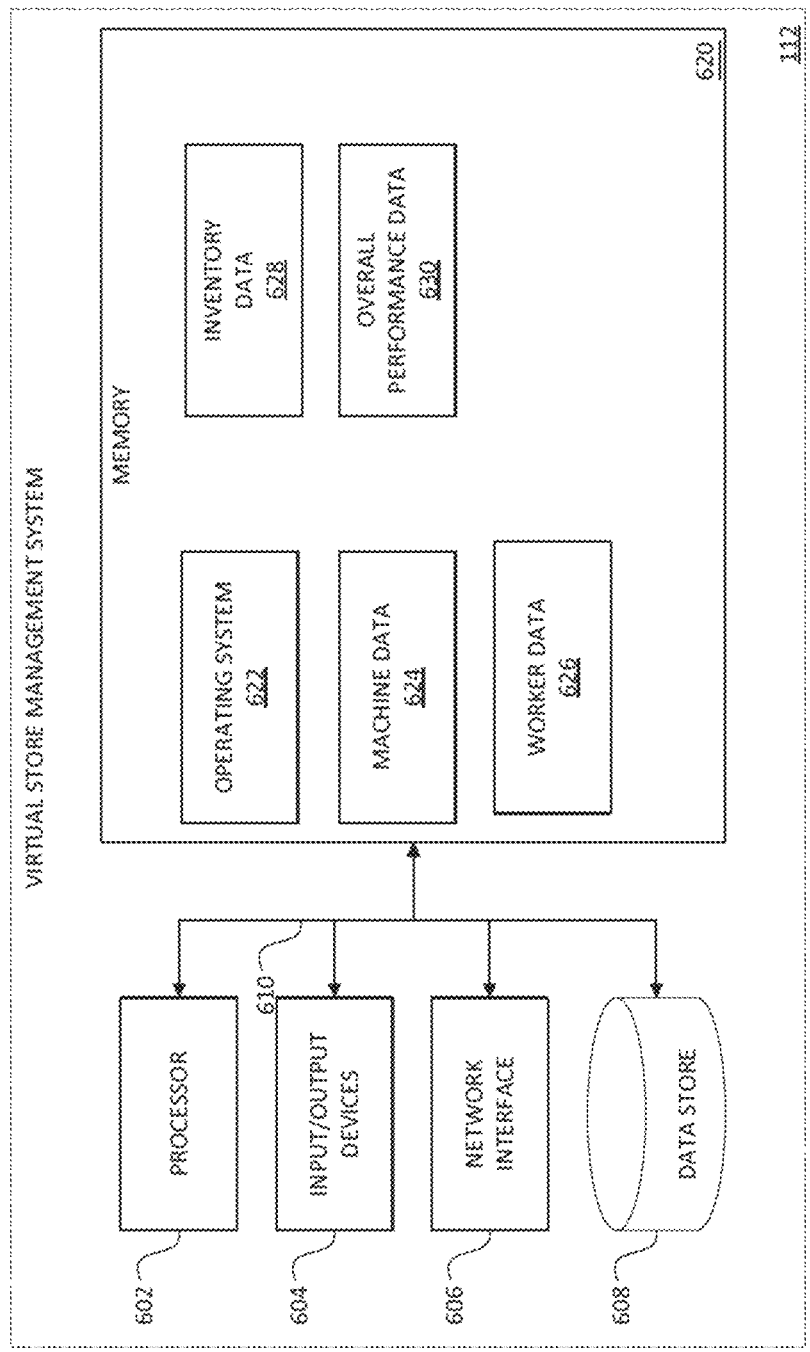
FIG. 6 depicts a general architecture of a computing device providing the virtual store management system for managing one or more virtual replications of a store.

FIG. 6 depicts a general architecture of a virtual store management system 112, which includes an arrangement of computer hardware and software components that may be used to implement aspects of the present disclosure. The virtual store management system 112 may include many more (or fewer) elements than those shown in FIG. 6. It is not necessary, however, that all of these elements be shown in order to provide an enabling disclosure.

As illustrated, the virtual store management system 112 includes a processor 602, input/output devices 604, a network interface 606, and a data store 608, all of which may communicate with one another by way of a communication bus 610. The network interface 606 may provide connectivity to one or more networks (such as the network 110 depicted in FIG. 1) or computing systems and, as a result, may enable the virtual store management system 112 to receive and send information and instructions from and to other computing systems or services, such as the simulation computing system 108 and/or the store management system 102 depicted in FIG. 1. In some embodiments, the virtual store management system 112 may process prompts received from the simulation computing system 108 and/or the store management system 102.

The processor 602 may also communicate to and from a memory 620. The memory 620 may contain computer program instructions (grouped as modules or components in some embodiments) that the processor 602 may execute in order to implement one or more embodiments. The memory 620 generally includes RAM, ROM, and/or other persistent, auxiliary, or non-transitory computer-readable media. The memory 620 may store an operating system 622 that provides computer program instructions for use by the processor 602 in the general administration and operation of the virtual store management system 112. The memory 620 may further store specific computer-executable instructions and other information (which may be referred to herein as "modules") for implementing aspects of the present disclosure. For example, the memory 620 may include machine data 624, worker data 626, inventory data 628, and/or overall performance data 630. In some embodiments, machine data 624, worker data 626, inventory data 628, and/or overall performance data 630 may be obtained from and/or stored in internal or external data stores, either directly or via the network 110.

It will be recognized that many of the components described in FIG. 6 are optional and that embodiments of the virtual store management system 112 may or may not combine components. Furthermore, components need not be distinct or discrete. Components may also be reorganized. For example, the virtual store management system 112 may be represented in a single physical device or, alternatively, may be split into multiple physical devices. In some embodiments, components illustrated as part of the virtual store management system 112 may additionally or alternatively be included in other computing devices (such as the store management system 102 of FIG. 1), such that some aspects of the present disclosure may be performed by the virtual store management system 112 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. In addition, the separation of various system components in the implementations described above should not be understood as requiring such separation in all implementations, and it should be understood that the described components and systems can generally be integrated together in a single product or packaged into multiple products.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

In summary, various illustrative embodiments and examples have been disclosed. Although systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

Various example embodiments of the disclosure can be described by the following clauses:

Clause 1: A system to output data associated with a modified virtual environment, the system comprising:
  a data store configured to store computer-executable instructions; and
  at least one processor in communication with the data store, wherein the computer-executable instructions, when executed by the at least one processor, cause the at least one processor to:
    identify environment data associated with a physical environment;
    generate a virtual environment based at least in part on the environment data;
    identify production data associated with the physical environment;
    modify one or more values of the environment data to generate modified environment data based at least in part on identifying the production data associated with the physical environment;
    generate a modified virtual environment based at least in part on the modified environment data;
    compare the modified virtual environment with the virtual environment based at least in part on the production data; and
    output data associated with the modified virtual environment based at least in part on comparing the modified virtual environment with the virtual environment.

Clause 2: The system of Clause 1, wherein the environment data comprises at least one of inventory data, environment configuration data, labor allocation data, environment layout data, or machine allocation data.

Clause 3: The system of Clause 1 or Clause 2, wherein to identify the production data, the computer-executable instructions, when executed by the at least one processor, further cause the at least one processor to obtain the production data, in real time, from one or more sensors.

Clause 4: The system of any one of Clauses 1 through 3, wherein to identify the production data, the computer-executable instructions, when executed by the at least one processor, further cause the at least one processor to obtain the production data, in real time, from a computing system associated with the physical environment, wherein the computing system associated with the physical environment is configured to:
  monitor a worker associated with the physical environment; and
  identify worker utilization data associated with the worker based at least in part on monitoring the worker, wherein the production data comprises the worker utilization data.

Clause 5: The system of Clause 4, wherein the worker is a robot worker or a human worker.

Clause 6: The system of Clause 4 or Clause 5, wherein the worker utilization data identifies a status of the worker at a particular time, wherein the status of the worker comprises at least one of active, idle, or walking.

Clause 7: The system of any one of Clauses 1 through 6, wherein to identify the production data, the computer-executable instructions, when executed by the at least one processor, further cause the at least one processor to obtain the production data, in real time, from a computing system associated with the physical environment, wherein the computing system associated with the physical environment is configured to:
  monitor a machine associated with the physical environment; and
  identify machine utilization data associated with the machine based at least in part on monitoring the machine, wherein the production data comprises the machine utilization data.

Clause 8: The system of any one of Clauses 1 through 7, wherein the production data comprises at least one of sensor data, machine data, ordering data, inventory data, or order processing data.

Clause 9: The system of any one of Clauses 1 through 8, wherein the production data comprises at least one of sensor data, machine data, ordering data, inventory data, or order processing data, wherein the computer-executable instructions, when executed by the at least one processor, further cause the at least one processor to:
  determine one or more of a speed of service associated with the physical environment, a throughput associated with the physical environment, or labor usage associated with the physical environment based at least in part on the production data.

Clause 10: The system of any one of Clauses 1 through 9, wherein the production data comprises at least one of sensor data, machine data, ordering data, inventory data, or order processing data, wherein the computer-executable instructions, when executed by the at least one processor, further cause the at least one processor to:
  determine one or more of a speed of service associated with the physical environment, a throughput associated with the physical environment, or labor usage associated with the physical environment based at least in part on the production data; and
  determine one or more user goals associated with a user, wherein the one or more user goals correspond to one or more of the speed of service, the throughput, or the labor usage, wherein comparing the modified virtual environment with the virtual environment is further based at least in part on the one or more user goals.

Clause 11: The system of Clause 10, wherein a first goal of the one or more user goals is associated with a first condition and a second goal of the one or more user goals is associated with a second condition, wherein comparing the modified virtual environment with the virtual environment is further based at least in part on the first condition and the second condition.

Clause 12: The system of any one of Clauses 1 through 11, wherein to compare the modified virtual environment with the virtual environment, the computer-executable instructions, when executed by the at least one processor, further cause the at least one processor to compare the production data associated with the physical environment with virtual production data associated with the modified virtual environment.

Clause 13: The system of any one of Clauses 1 through 12, wherein to generate the virtual environment based at least in part on the environment data, the computer-executable instructions, when executed by the at least one processor, further cause the at least one processor to generate the virtual environment using a simulation platform.

Clause 14: The system of any one of Clauses 1 through 13, wherein the computer-executable instructions, when executed by the at least one processor, further cause the at least one processor to:
  compare a plurality of modified virtual environments with the virtual environment based at least in part on the production data, wherein the plurality of modified virtual environments comprises the modified virtual environment; and
  select the modified virtual environment from the plurality of modified virtual environments based at least in part on comparing the plurality of modified virtual environments with the virtual environment, wherein outputting the data associated with the modified virtual environment is based at least in part on selecting the modified virtual environment.

Clause 15: The system of any one of Clauses 1 through 14, wherein the environment data is further associated with operation of the physical environment.

Clause 16: The system of any one of Clauses 1 through 15, wherein the computer-executable instructions, when executed by the at least one processor, further cause the at least one processor to: output a worker schedule, wherein a scheduling system dynamically defines the worker schedule.

Clause 17: The system of any one of Clauses 1 through 16, wherein to generate the virtual environment based at least in part on the environment data, the computer-executable instructions, when executed by the at least one processor, further cause the at least one processor to generate the virtual environment using a simulation platform, wherein the simulation platform maps a plurality of sets of environment data to a plurality of sets of virtual production data, wherein the plurality of sets of environment data comprises the environment data and the plurality of sets of production data comprises the production data.

Clause 18: The system of any one of Clauses 1 through 17, wherein to generate the virtual environment based at least in part on the environment data, the computer-executable instructions, when executed by the at least one processor, further cause the at least one processor to generate the virtual environment using a simulation platform, wherein the simulation platform is configured to:
  run a plurality of simulations to generate the modified virtual environment; and
  compare an output of each of the plurality of simulations to verify the modified virtual environment.

Clause 19: The system of any one of Clauses 1 through 18, wherein the physical environment comprises a store and the virtual environment comprises a virtual store.

Clause 20: The system of any one of Clauses 1 through 19, wherein the virtual environment comprises a virtual replication of a store.

Clause 21: The system of any one of Clauses 1 through 20, wherein the virtual environment comprises a model of the physical environment.

Clause 22: A computer-implemented method comprising:
  identifying environment data associated with a physical environment;
  generating a virtual environment based at least in part on the environment data;

identifying production data associated with the physical environment;
modifying one or more values of the environment data to generate modified environment data based at least in part on identifying the production data associated with the physical environment;
generating a modified virtual environment based at least in part on the modified environment data;
comparing the modified virtual environment with the virtual environment based at least in part on the production data; and
outputting data associated with the modified virtual environment based at least in part on comparing the modified virtual environment with the virtual environment.

Clause 23: A non-transitory computer-readable medium storing computer-executable instructions that, when executed by at least one processor, configure the at least one processor to:
identify environment data associated with a physical environment;
generate a virtual environment based at least in part on the environment data;
identify production data associated with the physical environment;
modify one or more values of the environment data to generate modified environment data based at least in part on identifying the production data associated with the physical environment;
generate a modified virtual environment based at least in part on the modified environment data;
compare the modified virtual environment with the virtual environment based at least in part on the production data; and
output data associated with the modified virtual environment based at least in part on comparing the modified virtual environment with the virtual environment.

What is claimed:

1. A system to output data associated with a modified virtual environment, the system comprising:
a data store configured to store computer-executable instructions; and
at least one processor in communication with the data store, wherein the computer-executable instructions, when executed by the at least one processor, cause the at least one processor to:
identify environment data associated with operation of one or more machines in a physical environment;
simulate, using a simulation platform, the physical environment based at least in part on the environment data to obtain a virtual environment, wherein the simulation platform is trained based at least in part on one or more mappings of particular production data to particular environment data;
identify first production data produced by the virtual environment and generated by the simulation platform;
modify one or more values of the environment data to generate modified environment data based at least in part on identifying the first production data produced by the virtual environment and generated by the simulation platform;
simulate, using the simulation platform, the physical environment based at least in part on the modified environment data to obtain a modified virtual environment;
identify second production data produced by the modified virtual environment and generated by the simulation platform;
compare a threshold to a difference between the second production data produced by the modified virtual environment and generated by the simulation platform and the first production data produced by the virtual environment and generated by the simulation platform; and
automatically adjust the operation of the one or more machines in the physical environment based at least in part on comparing the threshold to the difference, wherein to automatically adjust the operation of the one or more machines in the physical environment, the computer-executable instructions, when executed by the at least one processor, further cause the at least one processor to at least one of:
automatically adjust how the one or more machines in the physical environment process orders; or
automatically adjust how the one or more machines in the physical environment assign orders to workers.

2. The system of claim 1, wherein the environment data comprises at least one of inventory data, environment configuration data, labor allocation data, environment layout data, or machine allocation data.

3. The system of claim 1, wherein the computer-executable instructions, when executed by the at least one processor, further cause the at least one processor to:
obtain, in real time, third production data generated by one or more sensors; and
validate the virtual environment based at least in part on a comparison of the third production data generated by the one or more sensors with the first production data produced by the virtual environment and generated by the simulation platform.

4. The system of claim 1, wherein the computer-executable instructions, when executed by the at least one processor, further cause the at least one processor to:
obtain, in real time, third production data generated by a computing system associated with the physical environment; and
validate the virtual environment based at least in part on a comparison of the third production data generated by the computing system with the first production data produced by the virtual environment and generated by the simulation platform,
wherein the computing system associated with the physical environment is configured to:
monitor a worker associated with the physical environment; and
identify worker utilization data associated with the worker based at least in part on monitoring the worker, wherein the third production data generated by the computing system comprises the worker utilization data.

5. The system of claim 4, wherein the worker is a robot worker or a human worker.

6. The system of claim 4, wherein the worker utilization data identifies a status of the worker at a particular time, wherein the status of the worker comprises at least one of active, idle, or walking.

7. The system of claim 1, wherein the computer-executable instructions, when executed by the at least one processor, further cause the at least one processor to:
obtain, in real time, third production data generated by a computing system associated with the physical environment; and validate the virtual environment based at least in part on a comparison of the third production data generated by the computing system with the first production data produced by the virtual environment and generated by the simulation platform, wherein the computing system associated with the physical environment is configured to:
monitor a machine associated with the physical environment; and
identify machine utilization data associated with the machine based at least in part on monitoring the machine, wherein the third production data generated by the computing system comprises the machine utilization data.

8. The system of claim 1, wherein the first production data produced by the virtual environment and generated by the simulation platform comprises at least one of sensor data, machine data, ordering data, inventory data, or order processing data.

9. The system of claim 1, wherein the first production data produced by the virtual environment and generated by the simulation platform comprises at least one of sensor data, machine data, ordering data, inventory data, or order processing data, wherein the computer-executable instructions, when executed by the at least one processor, further cause the at least one processor to:
determine one or more of a speed of service associated with the virtual environment, a throughput associated with the virtual environment, or labor usage associated with the virtual environment based at least in part on the first production data produced by the virtual environment and generated by the simulation platform.

10. The system of claim 1, wherein the first production data produced by the virtual environment and generated by the simulation platform comprises at least one of sensor data, machine data, ordering data, inventory data, or order processing data, wherein the computer-executable instructions, when executed by the at least one processor, further cause the at least one processor to:
determine one or more of a speed of service associated with the virtual environment, a throughput associated with the virtual environment, or labor usage associated with the virtual environment based at least in part on the first production data produced by the virtual environment and generated by the simulation platform; and
determine one or more user goals associated with a user, wherein the one or more user goals correspond to one or more of the speed of service, the throughput, or the labor usage, wherein comparing the threshold to the difference is further based at least in part on the one or more user goals.

11. The system of claim 10, wherein a first goal of the one or more user goals is associated with a first condition and a second goal of the one or more user goals is associated with a second condition, wherein comparing the threshold to the difference is further based at least in part on the first condition and the second condition.

12. The system of claim 1, wherein the computer-executable instructions, when executed by the at least one processor, further cause the at least one processor to:
cause display of a representation of the modified virtual environment.

13. The system of claim 1, wherein the computer-executable instructions, when executed by the at least one processor, further cause the at least one processor to:
compare third production data produced by a plurality of modified virtual environments and generated by the simulation platform with the first production data produced by the virtual environment and generated by the simulation platform, wherein the plurality of modified virtual environments comprises the modified virtual environment; and
select the modified virtual environment from the plurality of modified virtual environments based at least in part on comparing the third production data produced by the plurality of modified virtual environments and generated by the simulation platform with the first production data produced by the virtual environment and generated by the simulation platform.

14. The system of claim 1, wherein the physical environment produces third production data, and wherein the virtual environment is validated based at least in part on a comparison of the third production data produced by the physical environment with the first production data produced by the virtual environment and generated by the simulation platform.

15. The system of claim 1, wherein the computer-executable instructions, when executed by the at least one processor, further cause the at least one processor to:
output a worker schedule based at least in part on comparing the threshold to the difference, wherein a scheduling system dynamically defines the worker schedule.

16. The system of claim 1, wherein the computer-executable instructions, when executed by the at least one processor, further cause the at least one processor to:
generate, using a machine learning model, adjusted environment data based at least in part on the environment data and comparing the threshold to the difference,
wherein to automatically adjust the operation of the one or more machines in the physical environment, the computer-executable instructions, when executed by the at least one processor, further cause the at least one processor to:
automatically adjust the operation of the one or more machines in the physical environment according to the adjusted environment data.

17. The system of claim 1, wherein the simulation platform is configured to:
run a plurality of simulations; and
compare an output of each of the plurality of simulations to verify the virtual environment.

18. The system of claim 1, wherein the physical environment comprises a store and the virtual environment comprises a virtual store.

19. The system of claim 1, wherein the virtual environment comprises a virtual replication of a store.

20. The system of claim 1, wherein the virtual environment comprises a model of the physical environment.

21. A computer-implemented method comprising:
identifying environment data associated with operation of one or more machines in a physical environment;
simulating, using a simulation platform, the physical environment based at least in part on the environment data to obtain a virtual environment, wherein the simulation platform is trained based at least in part on one or more mappings of particular production data to particular environment data;
identifying first production data produced by the virtual environment and generated by the simulation platform;
modifying one or more values of the environment data to generate modified environment data based at least in part on identifying the first production data produced by the virtual environment and generated by the simulation platform;

simulating, using the simulation platform, the physical environment based at least in part on the modified environment data to obtain a modified virtual environment;

identifying second production data produced by the modified virtual environment and generated by the simulation platform;

comparing a threshold to a difference between the second production data produced by the modified virtual environment and generated by the simulation platform and the first production data produced by the virtual environment and generated by the simulation platform; and automatically adjusting the operation of the one or more machines in the physical environment based at least in part on comparing the threshold to the difference, wherein automatically adjusting the operation of the one or more machines in the physical environment comprises at least one of:

automatically adjusting how the one or more machines in the physical environment process orders; or automatically adjusting how the one or more machines in the physical environment assign orders to workers.

22. A non-transitory computer-readable medium storing computer-executable instructions that, when executed by at least one processor, configure the at least one processor to:

identify environment data associated with operation of one or more machines in a physical environment;

simulate, using a simulation platform, the physical environment based at least in part on the environment data to obtain a virtual environment, wherein the simulation platform is trained based at least in part on one or more mappings of particular production data to particular environment data;

identify first production data produced by the virtual environment and generated by the simulation platform;

modify one or more values of the environment data to generate modified environment data based at least in part on identifying the first production data produced by the virtual environment and generated by the simulation platform;

simulate, using the simulation platform, the physical environment based at least in part on the modified environment data to obtain a modified virtual environment;

identify second production data produced by the modified virtual environment and generated by the simulation platform;

compare a threshold to a difference between the second production data produced by the modified virtual environment and generated by the simulation platform and the first production data produced by the virtual environment and generated by the simulation platform; and automatically adjust the operation of the one or more machines in the physical environment based at least in part on comparing the threshold to the difference, wherein to automatically adjust the operation of the one or more machines in the physical environment, the computer-executable instructions, when executed by the at least one processor, further configure the at least one processor to at least one of:

automatically adjust how the one or more machines in the physical environment process orders; or automatically adjust how the one or more machines in the physical environment assign orders to workers.

* * * * *